US012686777B2

(12) United States Patent
Yang et al.

(10) Patent No.: US 12,686,777 B2
(45) Date of Patent: Jul. 21, 2026

(54) ANTISTATIC RELEASE FILM

(71) Applicant: ZHEJIANG OUREN NEW MATERIALS CO., LTD., Jiaxing Zhejiang (CN)

(72) Inventors: Xiaoming Yang, Jiaxing Zhejiang (CN); Yaobang Li, Jiaxing Zhejiang (CN); Houjun Xia, Jiaxing Zhejiang (CN); Penghui Wu, Jiaxing Zhejiang (CN)

(73) Assignee: ZHEJIANG OUREN NEW MATERIALS CO., LTD., Jiaxing Zhejiang (CN)

( * ) Notice: Subject to any disclaimer, the term of this patent is extended or adjusted under 35 U.S.C. 154(b) by 175 days.

(21) Appl. No.: 18/704,761

(22) PCT Filed: Nov. 18, 2021

(86) PCT No.: PCT/CN2021/131463

§ 371 (c)(1),
(2) Date: Apr. 25, 2024

(87) PCT Pub. No.: WO2023/070772

PCT Pub. Date: May 4, 2023

(65) Prior Publication Data

US 2024/0417574 A1      Dec. 19, 2024

(30) Foreign Application Priority Data

Oct. 25, 2021    (CN) .......................... 202111240135.1

(51) Int. Cl.
| | |
|---|---|
| *C09D 5/24* | (2006.01) |
| *C08J 7/04* | (2020.01) |
| *C08J 7/044* | (2020.01) |
| *C09D 7/20* | (2018.01) |
| *C09D 7/47* | (2018.01) |
| *C09D 7/48* | (2018.01) |
| *C09D 7/63* | (2018.01) |
| *C09D 7/65* | (2018.01) |
| *C09D 175/04* | (2006.01) |

(52) U.S. Cl.
CPC ................ *C09D 5/24* (2013.01); *C08J 7/042* (2013.01); *C08J 7/044* (2020.01); *C09D 7/20* (2018.01); *C09D 7/47* (2018.01); *C09D 7/48* (2018.01); *C09D 7/63* (2018.01); *C09D 7/65* (2018.01); *C09D 175/04* (2013.01); *C08J 2327/06* (2013.01); *C08J 2367/02* (2013.01); *C08J 2401/28* (2013.01); *C08J 2429/04* (2013.01); *C08J 2475/04* (2013.01)

(58) Field of Classification Search
None
See application file for complete search history.

(56) References Cited

FOREIGN PATENT DOCUMENTS

| | | |
|---|---|---|
| CN | 1993633 A | 7/2007 |
| CN | 108690524 A | 10/2018 |
| CN | 111978582 A | * 11/2020 |
| CN | 111978879 A | 11/2020 |
| CN | 112251162 A | 1/2021 |
| JP | 2016047881 A | 4/2016 |

OTHER PUBLICATIONS

International search report of PCT/CN2021/131463.

* cited by examiner

*Primary Examiner* — Sheeba Ahmed

(57) ABSTRACT

An antistatic release film, comprising a substrate layer, an antistatic coating, and a release agent coating. The antistatic coating is located between the release agent coating and the substrate layer; the antistatic coating is obtained by drying a coating liquid; and the coating liquid is composed of the following components in parts by weight: 100 parts of polyurethane resin, 40-60 parts of polyvinyl alcohol, 2-4 parts of sodium octyl sulfate, 1-3 parts of N-ethyl-N—(3-sulfopropyl)-3-methylaniline sodium salt, 8-12 parts of dibutyl sebacate, 40-60 parts of n-butanol, 20-30 parts of isobutyl acetate, 0.8-1.5 parts of hydroxyethyl cellulose, 0.3-0.8 part pf 3-acetylbenzoic acid, 0.2-0.8 part of triethylenetetramine, 0.5-1.2 parts of a silane coupling agent, 0.5-1 part of an antioxidant, and 0.6-2 parts of a leveling agent. The antistatic release film enables the surface resistance of the antistatic coating in the antistatic release film to be almost unchanged after 200 days, thereby improving the performance reliability of the antistatic release film.

4 Claims, 1 Drawing Sheet

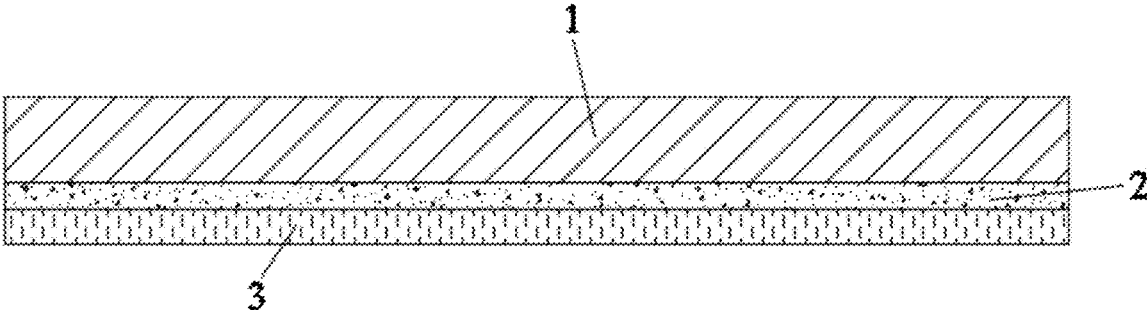

ANTISTATIC RELEASE FILM

TECHNICAL FIELD

The present invention belongs to the technical field of release films, and particularly relates to an antistatic release film.

BACKGROUND

At present, release films are widely used in the processing procedures of electronic products. When the electronic device needs to be lighter, thinner and shorter, the power density of the electrical operation needs to be continuously improved, and the application occasions of these electronic products generally have anti-static requirements, because the existence of static electricity is not only that the surface of the product is easy to adsorb dust, but also the accuracy of the line is more affected, or the line breakdown in the processing process of the electronic product is caused, so that the product is out of effect. Therefore, it is necessary to perform electrostatic protection treatment on the protective film. Existing release films suffer from poor anti-static performance over time, presenting an uncertain risk to the product.

SUMMARY OF THE PRESENT INVENTION

An objective of the present invention is to provide an antistatic release film, which can keep the surface resistance change of the antistatic coating in the antistatic release film almost unchanged after 200 days, thereby improving the reliability of the performance of the protective film.

In order to achieve the above object, the technical solution adopted by the present invention is: an antistatic release film, comprising a substrate layer, an antistatic coating, and a release agent coating, The antistatic coating is located between the release agent coating and the substrate layer; the antistatic coating is obtained by drying a coating liquid; and the coating liquid is composed of the following components in parts by weight:

100 parts of polyurethane resin,
40-60 parts of polyvinyl alcohol,
2-4 parts of sodium octyl sulfate,
1-3 parts of N-ethyl-N-(3-sulfopropyl)-3-methylaniline sodium salt,
8-12 parts of dibutyl sebacate,
40-60 parts of n-butanol,
20-30 parts of isobutyl acetate,
0.8-1.5 parts of hydroxyethyl cellulose,
0.3-0.8 part pf 3-acetylbenzoic acid,
0.2-0.8 part of triethylenetetramine,
0.5-1.2 parts of a silane coupling agent,
0.5-1 part of an antioxidant, and 0.6-2 parts of a leveling agent.

The technical solution further improved in the above technical solution is as follows:

In the above solution, the antioxidant is selected from an antioxidant 1010, an antioxidant 1024, or an antioxidant 2246.

In the above solution, the leveling agent is selected from one of the leveling agent 440, the leveling agent DC 57, and the leveling agent DC 3.

In the above solution, the substrate layer is one of a PET layer, a TPU layer, a PAR layer, a CPP layer, a PVC layer, a SEPS layer and an SEBS layer.

In the above solution, the antistatic coating has a thickness of 3-10 μm.

Due to the application of the above technical solutions, the present invention has the following advantages over the prior art:

The antistatic release film of the present invention further adds 0.8-1.5 parts of hydroxyethyl cellulose and 0.3-0.8 part of 3-acetylbenzoic acid based on sodium octyl sulfate and N-ethyl-N-(3-sulfopropyl)-3-methylaniline sodium salt, so that the resistance change of the surface of the antistatic coating in the antistatic release film can be kept almost unchanged after 200 days, thereby improving the reliability of the performance of the protective film.

BRIEF DESCRIPTION OF DRAWINGS

Figure is a schematic structural diagram of an antistatic release film according to the present invention.

In the above drawings: 1. a substrate layer; 2. an antistatic coating; and 3. a release agent coating.

DETAILED DESCRIPTION

In the description of the present patent, it should be noted that the orientation or positional relationship indicated by the terms "center", "upper", "lower", "left", "right", "vertical", "horizontal", "inner", "outer" and the like is merely for the convenience of describing the present disclosure and simplifying the description, rather than indicating or implying that the referred device or element must have a specific orientation, and is constructed and operated in a specific orientation, and therefore cannot be understood as a limitation to the present disclosure; the terms "first", "second" and "third" are used for descriptive purposes only and cannot be understood as indicating or implying relative importance; in addition, unless expressly specified and limited otherwise, the terms "mounted", "connected" and "connected" should be understood in a broad sense, for example, The connection may also be a detachable connection, or an integral connection, may be a mechanical connection or an electrical connection, may be a direct connection, or may be indirectly connected by an intermediate medium, and may be a communication inside the two elements. For those of ordinary skill in the art, the specific meanings of the above terms in this patent can be understood in specific situations.

The present invention will be further described below with reference to the examples:

Examples 1-4: an antistatic release film, comprising a substrate layer 1, an antistatic coating 2 and a release agent coating 3, wherein the antistatic coating 2 is located between the release agent coating 3 and the substrate layer 1, the antistatic coating 2 is obtained by drying a coating liquid, and the coating liquid is composed of the following components in parts by weight, as shown in Table 1:

TABLE 1

| Components | Example 1 | Example 2 | Example 3 | Example 4 |
|---|---|---|---|---|
| polyurethane resin | 100 parts | 100 parts | 100 parts | 100 parts |
| polyvinyl alcohol | 50 parts | 45 parts | 50 parts | 55 parts |
| sodium octyl sulfate | 3.5 parts | 2.5 parts | 2 parts | 3.5 parts |
| N-ethyl-N-(3-sulfopropyl)-3-methylaniline | 3 parts | 2.5 parts | 2 parts | 3 parts |

TABLE 1-continued

| Components | Example 1 | | Example 2 | | Example 3 | | Example 4 | |
|---|---|---|---|---|---|---|---|---|
| sodium salt | | | | | | | | |
| dibutyl sebacate | 10 | parts | 8 | parts | 10 | parts | 9 | parts |
| n-butanol | 55 | parts | 45 | parts | 55 | parts | 45 | parts |
| isobutyl acetate | 28 | parts | 24 | parts | 28 | parts | 24 | parts |
| hydroxyethyl cellulose | 1 | parts | 0.8 | parts | 1.2 | parts | 1 | parts |
| 3-acetylbenzoic acid | 0.4 | parts | 0.8 | parts | 0.8 | parts | 0.5 | parts |
| triethylenetetramine | 0.6 | parts | 0.4 | parts | 0.6 | parts | 0.3 | parts |
| silane coupling agent | 0.8 | parts | 1 | parts | 0.8 | parts | 1 | parts |
| antioxidant | 0.6 | parts | 0.9 | parts | 0.5 | parts | 0.8 | parts |
| leveling agent | 1.2 | parts | 0.8 | parts | 1 | parts | 0.8 | parts |

The antioxidant of Example 1 is selected from an antioxidant 1010, the leveling agent is selected from a leveling agent DC 57, the substrate layer 1 is a PET layer, and the antistatic coating 3 has a thickness of 4 μm.

The antioxidant in Example 2 is selected from the antioxidant 1010, the leveling agent is selected from the leveling agent DC 3, the substrate layer 1 is a PVC layer, and the thickness of the antistatic coating 3 is 6 μm.

The antioxidant of Example 3 is selected from the antioxidant 1010, the leveling agent is selected from the leveling agent 440, the substrate layer 1 is a PET layer, and the thickness of the antistatic coating 3 is 4 μm.

The antioxidant of Example 4 is selected from an antioxidant 2246, the leveling agent is selected from a leveling agent DC57, the substrate layer 1 is a PVC layer, and the thickness of the antistatic coating 3 is 6 μm.

A process for preparing the antistatic release film comprises the following steps: mixing 100 parts of polyurethane resin, 40-60 parts of polyvinyl alcohol, 2-4 parts of sodium octyl sulfate, 1-3 parts of N-ethyl-N-(3-sulfopropyl)-3-methylaniline sodium salt, 8-12 parts of dibutyl sebacate, 40-60 parts of n-butanol, 20-30 parts of isobutyl acetate, 0.8-1.5 parts of hydroxyethyl cellulose, 0.3-0.8 part pf 3-acetylbenzoic acid, 0.2-0.8 part of triethylenetetramine, 0.5-1.2 parts of a silane coupling agent, 0.5-1 part of an antioxidant, and 0.6-2 parts of leveling agent, and uniformly stirring to obtain coating liquid;

uniformly coating the coating solution on the substrate layer 1, baking and drying to obtain the antistatic substrate film, and then coating the surface of the antistatic substrate film with a release agent coating 3 to obtain the antistatic release film.

Comparative Examples 1 and 2: an antistatic release film, comprising a substrate layer 1, an antistatic coating 2 and a release agent coating 3, wherein the antistatic coating 2 is located between the release agent coating 3 and the substrate layer 1, the antistatic coating 2 is obtained by drying a coating liquid, and the coating liquid is composed of the following components in parts by weight, as shown in Table 2:

TABLE 2

| Components | Example 1 | Example 2 |
|---|---|---|
| polyurethane resin | 100 parts | 100 parts |
| polyvinyl alcohol | 50 parts | 50 parts |
| sodium octyl sulfate | 3.5 parts | 3.5 parts |
| N-ethyl-N-(3-sulfopropyl)-3-methylaniline sodium salt | 3 parts | 3 parts |

TABLE 2-continued

| Components | Example 1 | Example 2 |
|---|---|---|
| dibutyl sebacate | 10 parts | 10 parts |
| n-butanol | 55 parts | 55 parts |
| isobutyl acetate | 28 parts | 28 parts |
| hydroxyethyl cellulose | — | 1 parts |
| 3-acetylbenzoic acid | 0.4 parts | — |
| triethylenetetramine | 0.6 parts | 0.6 parts |
| silane coupling agent | 0.8 parts | 0.8 parts |
| antioxidant | 0.6 parts | 0.6 parts |
| leveling agent | 1.2 parts | 1.2 parts |

The comparative examples were prepared in the same manner as the examples.

The properties of anti-static release films made from Examples 1~4 and Comparative Examples 1-2 above are shown in Table 3:

TABLE 3

| Test items | Examples | | | | Comparative Examples | |
|---|---|---|---|---|---|---|
| | 1 | 2 | 3 | 4 | 1 | 2 |
| First Surface Impedance(Ω) | $2.5*10^8$ | $2.6*10^8$ | $2.8*10^8$ | $2.3*10^8$ | $2.8*10^8$ | $2.6*10^8$ |
| Surface impedance after 200 days (Ω) | $2.3*10^8$ | $2.7*10^8$ | $2.9*10^8$ | $2.5*10^8$ | $8.2*10^8$ | $9.3*10^8$ |
| Transmittance (%) | 93 | 94 | 93 | 93 | 92 | 93 |

The anti-static coatings in the anti-static release films obtained from the Examples and Comparative Examples were tested for surface impedance using surface impedance testing instrument SRM-110 with the test standard ASTM-D257, as shown in the evaluation results of Table 3, with little to no change in surface impedance after 200 days for the anti-static coatings in the anti-static release films of Examples and an increase in surface impedance after 200 days for the Comparative Examples; the present invention allows to maintain almost no change in the surface resistance of the anti-static coating in the anti-static release film after 200 days, thereby improving the reliability of the performance of the protective film.

The above-described embodiments are merely illustrative of the technical idea and features of the present invention, and are intended to enable those skilled in the art to understand the content of the present invention and to practice it, and are not intended to limit the scope of protection of the present invention. Equivalent changes or modifications in accordance with the spirit of the invention are intended to be included within the scope of the invention.

The invention claimed is:

1. An antistatic release film, comprising a substrate layer (1), an antistatic coating (2), and a release agent coating (3); wherein the antistatic coating (2) is located between the release agent coating (3) and the substrate layer (1); the antistatic coating (2) is obtained by drying a coating liquid; and the coating liquid is composed of the following components in parts by weight:

100 parts of polyurethane resin, 40-60 parts of polyvinyl alcohol, 2-4 parts of sodium octyl sulfate, 1-3 parts of N-ethyl-N-(3-sulfopropyl)-3-methylaniline sodium salt, 8-12 parts of dibutyl sebacate, 40-60 parts of n-butanol,

20-30 parts of isobutyl acetate, 0.8-1.5 parts of hydroxyethyl cellulose, 0.3-0.8 part of 3-acetylbenzoic acid, 0.2-0.8 part of triethylenetetramine, 0.5-1.2 parts of a silane coupling agent, 0.5-1 part of an antioxidant, and 0.6-2 parts of a leveling
  agent.

2. The antistatic release film of claim 1, wherein the
antioxidant is selected from an antioxidant 1010, an antioxidant 1024, or an antioxidant 2246;

wherein the antioxidant 1010 is pentaerythritol tetrakis
    (3-(3,5-di-tert-butyl-4-hydroxyphenyl)propionate);

the antioxidant 1024 is 2',3-Bis[[3-[3,5-di-tert-butyl-4-
    hydroxyphenyl]propionyl]]propionohydrazide;

the antioxidant 2246 is 2,2'-methylenebis(4-methyl-6-
    tert-butylphenol).

3. The antistatic release film of claim 1, wherein the
substrate layer is one of a polyethylene terephthalate (PET)
layer, a thermoplastic polyurethane (TPU) layer, a polyarylate (PAR) layer, a cast polypropylene (CPP) layer, a polyvinyl chloride (PVC) layer, a styrene-ethylene-propylene-styrene block copolymer (SEPS) layer, and a styrene-ethylene-butylene-styrene block copolymer (SEBS) layer.

4. The antistatic release film of claim 1, wherein the
antistatic coating has a thickness of 3-1 0 pm.

\* \* \* \* \*